June 12, 1956   E. HAGOOD   2,750,046
PRESSURE CONTROL FOR SLIDABLE HEAD IN A PROPANE FILTER DRUM
Filed Jan. 26, 1953   3 Sheets-Sheet 1

INVENTOR.
Ernest Hagood
BY Chas. Denegre
Attorney.

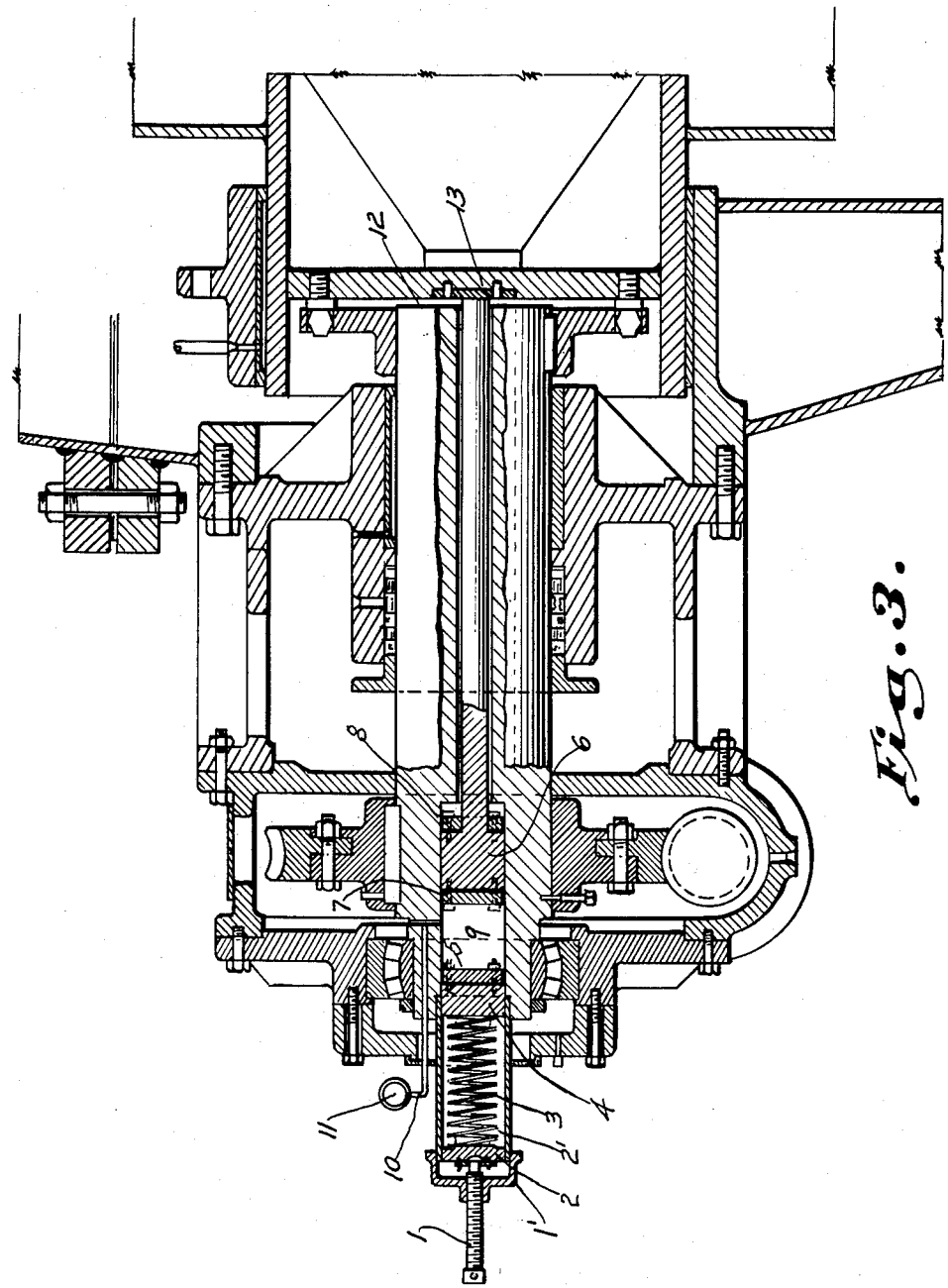

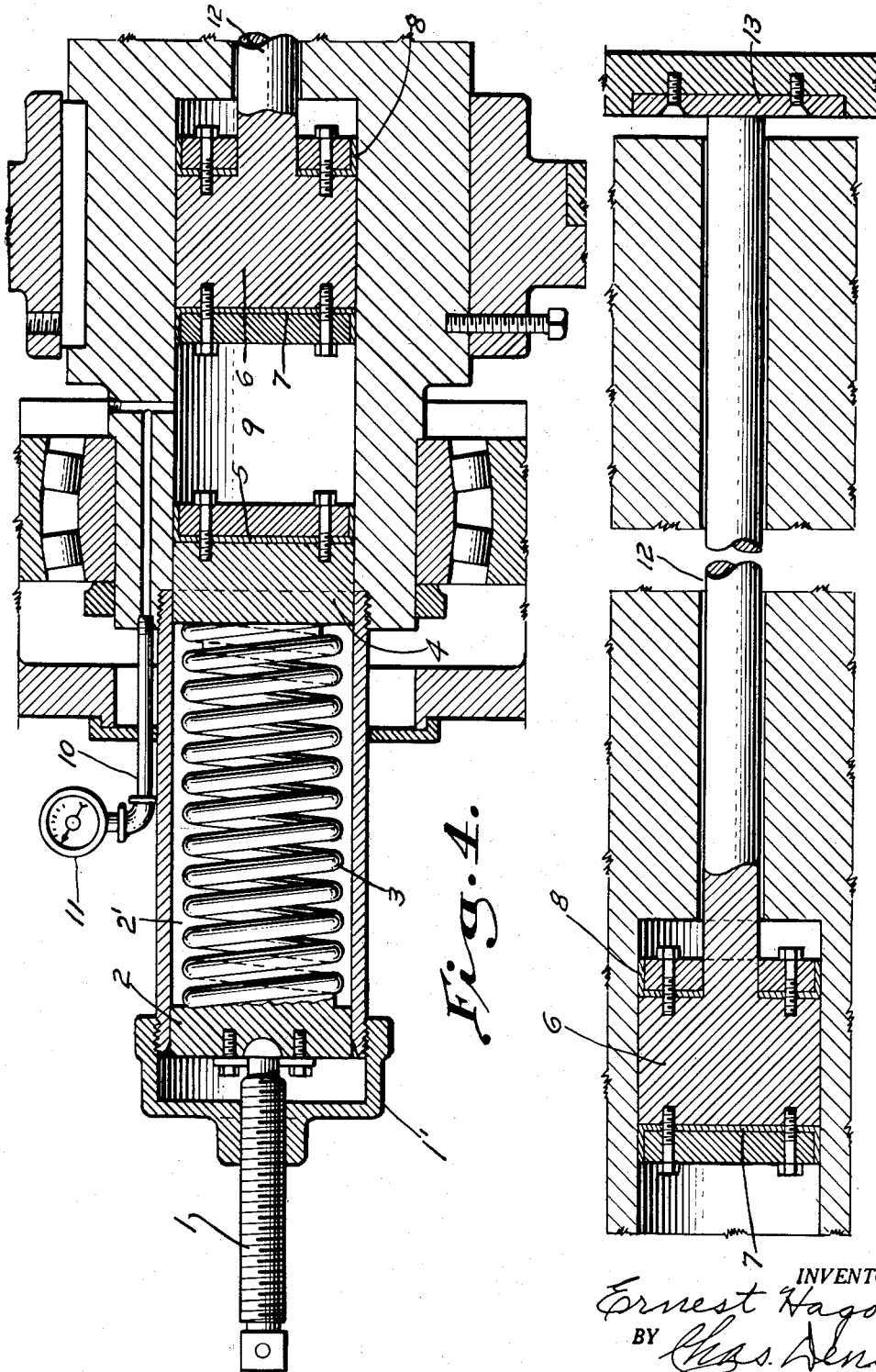

United States Patent Office 2,750,046
Patented June 12, 1956

2,750,046

PRESSURE CONTROL FOR SLIDABLE HEAD IN A PROPANE FILTER DRUM

Ernest Hagood, Birmingham, Ala.

Application January 26, 1953, Serial No. 333,321

3 Claims. (Cl. 210—130)

This invention relates to an automatic pressure control for a propane drum filter valve. It has for its main objects to provide such a control that will be highly satisfactory for the purpose intended, simple in structure, comparatively cheap to manufacture, easy to install, and extremely durable.

At the present time the controls in use are very complicated and expensive to produce, and require much labor for repairs if any of the mechanism gets out of order. The present invention will eliminate such objectionable features.

Other objects and advantages will appear from the drawings and description.

Figure 2:
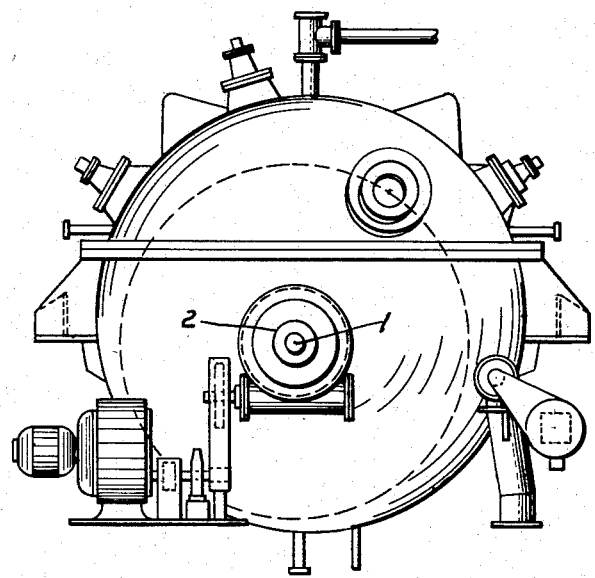
Figure 1:
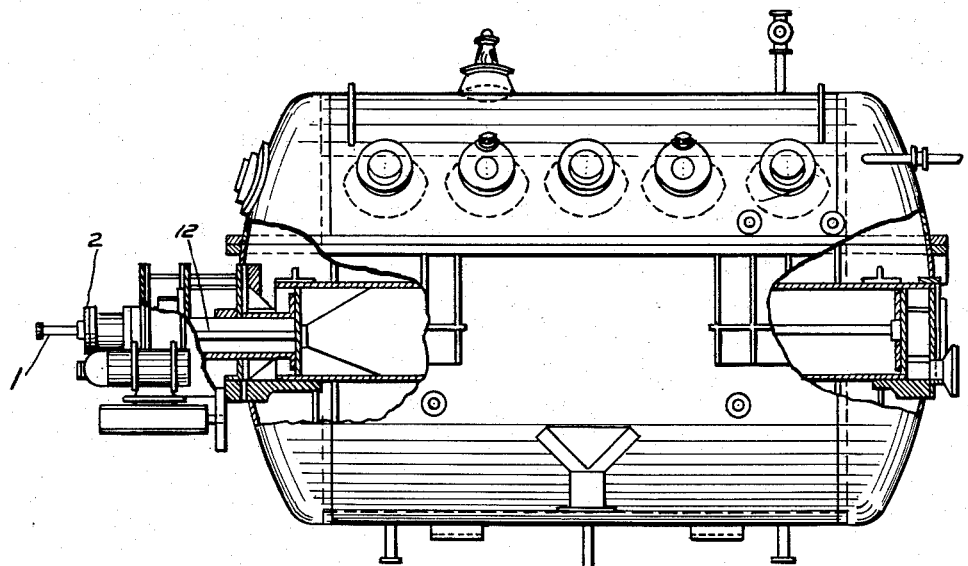

By referring generally to the drawings, a part of this application, it will be observed that Fig. 1 is a side elevational view of a propane drum, partly cut away, that contains and includes the mechanism for refining oil by removing wax therefrom, and is no part of the present invention, but works in combination with the control, the present invention, which is mounted on one end of the drum; Fig. 2 is an end view of Fig. 1; Fig. 3 is an enlarged sectional view of the pressure control mechanism according to the present invention and the end of the drum on which it is attached; Fig. 4 is an enlarged sectional view of part of the control mechanism; and Fig. 5 is an enlarged detail sectional and full view of some parts of the mechanism.

Similar reference numerals refer to similar parts throughout the several views.

Referring to the drawings in detail it will be seen that the control comprises a set screw 1 inserted through a threaded hole in a cap 1' and makes contact with a slidable head 2, in which it is revolvable, in a cylinder 2'. A coil spring 3 is positioned in expanded tension condition in the cylinder with one end of the spring in contact with the slidable head 2 and the other end in contact with another slidable head 4 having packing 5 thereon. A third slidable head 6 is positioned in the cylinder 2' with space 9 between slidable heads 4 and 6. Packings 7 and 8 are attached on the ends of slidable head 6. The space 9 is filled with heavy oil and has a pipe 10 leading from space 9 to a pressure gage 11. A rod 12 leads from head 6 with its other end in contact with a slidable head 13 in a drum part of which is shown. In operation it is necessary to maintain a certain pressure on the head 13 in order to extract wax from oil (not shown) in the drum partly shown. Therefore it is necessary to have oil in the space 9 in order to determine the pressure exerted against the head 13, the pressure being subject to increase or decrease by screwing the set screw 1 inward or outward.

The extracting of wax from oil is no part of this invention which is limited to the means as shown and described for regulating the amount of pressure for the purpose.

The various parts of the pressure control mechanism may be made of any material suitable for the purpose. Also the parts may be made in different sizes and capacities, depending on how and where to be used and the capacity of the wax extracting mechanism.

While I have shown and described the preferred embodiment of my invention, I do not wish to limit same to the exact and precise details of structure, but reserve the right to make all modifications and changes so long as they remain within the scope of the invention and the following claims.

Having described my invention I claim:

1. A pressure control for a propane drum filter comprising, a set screw mounted in combination with a cap through which it is inserted, a cylinder, said cap attached on an end of the cylinder, a slidable head within the cylinder, the inner end of the set screw mounted revolvable in said slidable head, a coil spring mounted within said cylinder with one end of the spring in contact with said slidable head, a second slidable head mounted in the cylinder, the other end of the spring in contact with said second slidable head, a third slidable head mounted in said cylinder and positioned apart from said second head; oil in the space between the said second and third heads, a pressure gage, a pipe leading from the oil between the heads to said pressure gage, a rod attached by one end thereof in the end of the third slidable head opposite the oil space, the other end of the rod in contact with the slidable head of the propane drum for control of the extracting of wax mechanism in the drum.

2. A pressure control for a propane drum filter according to claim 1, and being further characterized by having packing on the head that is in contact with the set screw, and having packing on the other head that is adjacent the other end of the spring, and having packing on each end of the other slidable head that is in contact with the rod that leads to the slidable head in the drum.

3. A pressure control for use in combination with a propane filter drum comprising a set screw mounted in combination with a cap having a threaded hole of a size to fit the screw, a cylinder, said cap attached on an end of the cylinder, a slidable tight fitting head within the cylinder, the inner end of the set screw mounted revolvable in said slidable head, a coil spring mounted within said cylinder with one end of the spring in contact with said slidable head, a second tight fitting slidable head mounted in the cylinder with the other end of the spring in contact with said slidable head, a third tight fitting slidable head mounted in said cylinder and positioned apart from said second head; oil in the space between the said second and third heads and adapted to hold the heads spaced apart, a pressure gage, a pipe leading from said oil to the gage, a rod attached by one end thereof in the end of the third slidable head opposite the oil, the other end of the rod in contact with a slidable head within the propane filter drum, said set screw being adapted when screwed inward to exert pressure on the head and spring and oil between the heads to thus increase the pressure on oil in the filter drum and adjacent oil therein.

References Cited in the file of this patent
UNITED STATES PATENTS 2,081,398   Giles _____ May 25, 1937
2,131,303   Lelund _____ Sept. 27, 1938